May 23, 1933.　　　A. O. COBBS　　　1,910,751

VISIBLE CERTIFICATE HOLDER

Filed March 2, 1931

INVENTOR.
A. O. Cobbs
BY
M. Talbert Dick
ATTORNEY.

Patented May 23, 1933

1,910,751

UNITED STATES PATENT OFFICE

ANSALEM ORVILLE COBBS, OF DES MOINES, IOWA

VISIBLE CERTIFICATE HOLDER

Application filed March 2, 1931. Serial No. 519,501.

The principal object of my invention is to provide a certificate holder for automotive vehicles such as automobiles and trucks that may be quickly attached to or detached from the steering column of the vehicle.

A further object of my invention is to provide a certificate holder for holding automobile license certificates, drivers' certificates, and the like that permits the certificate to be viewed from a point inside the vehicle to which it is secured as well as from a position outside of the vehicle.

A still further object of my invention is to provide a visible certificate holder for use in automobiles and the like that may easily and quickly have a certificate inserted in the same or removed from the same.

A still further object of my invention is to provide an automobile certificate holder that does not in any way damage the vehicle to which it is secured and one that does not detract from the refined appearance of the seating compartment of the vehicle in which it is used.

A still further object of my invention is to provide an automobile or driver's certificate holder that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

In many States and cities of the United States, operators of vehicles are required by law to display the vehicle license certificate or driver's license in a conspicuous place inside the seating compartment of the vehicle.

As is well known, many devices for holding certificates have been placed on the market, but these devices are usually in the form of a rigid frame and must be attached to the inside of the vehicle by bolts or screws, thereby not only permanently damaging the vehicle and requiring valuable installation time, but making it difficult to easily and readily remove or place certificates in the same. I have eliminated such objections by providing a flexible certificate holder that may be easily and quickly attached to or detached from the steering column of the vehicle.

Figure 1:
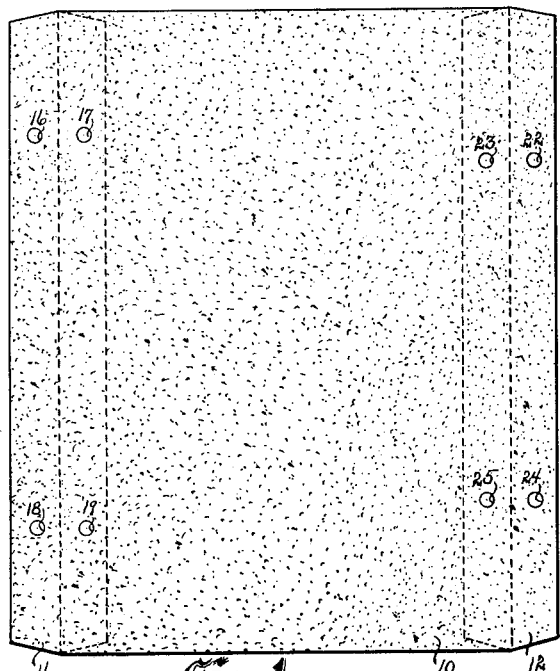
Fig. 1 is a plan view of the single piece of leather or other flexible material used in making the certificate holder, with dotted lines to show the folding of its side marginal edge portions back upon itself.
Figure 2:
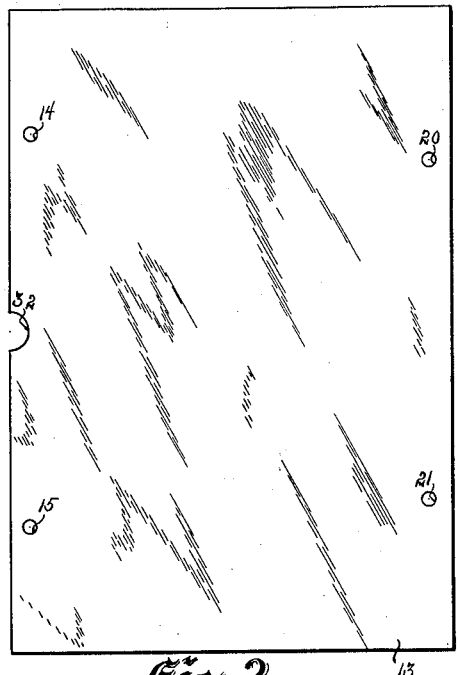
Fig. 2 is a plan view of a sheet of transparent material such as celluloid, isinglass or the like used in making my certificate holder and which forms the face or front side of the certificate holder.
Figure 3:
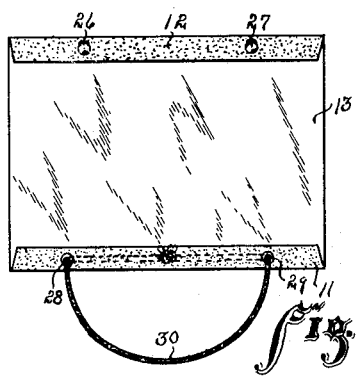
Fig. 3 is a front plan view of my complete certificate holder ready for use.

I have used the numeral 10 to designate the base portion of the invention. This base may be made of any suitable flexible material such as leather, leatherette, or the like. This base portion 10 forms the back of the certificate holder. The numerals 11 and 12 designate the two side marginal edge portions of the base 10 and which are bent over and upon the back portion, to assume positions as shown by dotted lines in Fig. 1. However, before the members 11 and 12 are folded over upon the back portion 10, a sheet 13 of transparent material such as isinglass, celluloid or the like is laid upon the base 10. This transparent face 13 which forms the front side of the certificate holder is approximately the same size as the base 10, which forms the back of the certificate holder. The numerals 14 and 15 designate two holes near one of the side marginal edges of the transparent sheet 13. These two holes are spaced apart, as shown in Fig. 2, and are so positioned that the hole 14 will register with the hole 16 in the flap portion 11 and the hole 17 in the base 10, and the hole 15 will register with the hole 18 in the portion 11 and the hole 19 in the base 10.

The numerals 20 and 21 designate holes similar to the holes 14 and 15, but are located at the other marginal side portion of the transparent sheet 13. When the sheet portion 13 is placed on the base 10, the hole 20 registers with the hole 22 in the flap portion 12 and the hole 23 in the base 10, and the hole 21 registers with the hole 24 in the portion 12 and the hole 25 in the base 10. The numeral 26 designates a common hook rivet extending through the holes 22, 20 and 23. The numeral 27 designates a similar rivet having a hook portion, but extending through the holes 24, 21 and 25. The numeral 28 designates a hollow rivet extending through the holes 16, 14 and 17. The numeral 29 designates a similar hollow rivet, but extending through the holes 18, 15 and 19. By this construction, the back portion 10 of the certificate holder will be permanently secured to the transparent front of the certificate holder without necessitating the sewing of the two parts together. A certificate holder thus formed is not only economical in manufacture, but of pleasing appearance.

Figure 4:
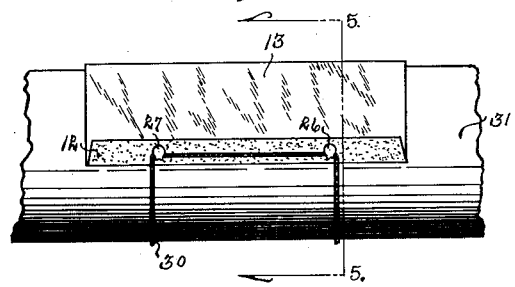
Fig. 4 is a side view of the invention secured on the steering column of a vehicle.
Figure 5:
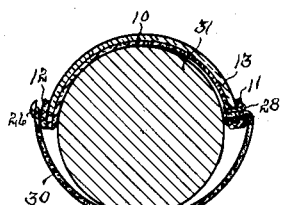
Fig. 5 is a cross sectional view of the invention on a steering wheel column taken on line 5—5 of Fig. 4 and more fully illustrates its construction.

The numeral 30 designates a strand of stretchable material such as elastic cord. This cord has its two ends passed through the hollow rivets 28 and 29 and then tied together as shown in the drawing. This completes my certificate holder and to attach it around a steering column 31 it is merely necessary to fold the certificate holder partially around the column and manually draw the elastic cord around the balance of the column and hook the same on the two hook members 26 and 27, as shown in Fig. 4.

To accomplish this, it is necessary to stretch the cord 30, thereby yieldingly holding the certificate holder tightly on the steering column inside the seating compartment of the vehicle, in which position it may be easily viewed from a position inside the vehicle or from a position outside of the vehicle. To remove the certificate holder from the column 31 it is merely necessary to stretch the cord 30 and unhook it from the hooks 28 and 29.

The certificate to be displayed may be inserted between the back 10 and face 13 from either end of the holder and may be as easily removed.

In order that the portions of the cord 30 that extends transversely of the longitudinal axis of the steering column will extend in desirable straight parallel lines and properly hold the certificate holder when the same is on a steering column, the holes 20 and 21 through which the hook rivets 26 and 27 extend are closer together than the holes 14 and 15 which hold the hollow rivets 28 and 29 thereby causing the outer side of the hook rivets to be in line with the inner side walls of the hollow rivets 28 and 29, which are positioned oppositely from them, respectively. As the certificate holder is yieldingly held on the steering column it will not only stay in any position it is placed, but will yieldingly prevent the accidental removal of the certificate from between the base 10 and face 13.

A notch 32 may be cut in the side of the face portion 13 to facilitate the manufacture of the certificate holder. By providing this notch 32 the proper position of the face portion 13 on the base 10 may be immediately ascertained in order that the holes in the face 13 will properly match the holes in the leather portion.

From the foregoing it will readily be seen that I have provided a certificate holder that will not rattle or create noise while the vehicle is in motion and one that is easily manufactured and without the employment of a sewing machine to sew the parts together.

Some changes may be made in the construction and arrangement of my improved visible certificate holder, without departing from the real spirit and purpose of my invention, and it is my intention to cover by my claims any modified forms of structure or use of mechanical equivalents which may be reasonably included within their scope.

I claim:

1. In a device of the class described, a base portion of flexible material designed to form the back of the certificate holder, a sheet of transparent material on said base portion and designed to form the transparent face of said certificate holder, a marginal flap integral with each marginal side of said base portion folded over the two marginal side portions of said transparent member, two rivets extending through one of said flaps and the transparent sheet and base member adjacent that flap, a hook portion on each of said rivets, two hollow rivets extending through the other flap and the transparent material and base member adjacent that flap; said last mentioned rivets having a distance between them greater than the distance between the first mentioned two rivets, and a loop of elastic cord extending through said hollow rivets.

2. An automobile registration card holder comprising a rectangular shaped flexible case to be bent about the steering column of an automobile and having a sight opening to expose a registration card positioned therein, hooks secured to the case adjacent one edge, said case having openings adjacent the opposite edge from the hooks, and an elastic member having its ends connected, said member extending through the last mentioned openings and being engageable over the hooks to retain the case on the steering columns of different sizes.

ANSALEM ORVILLE COBBS.